(12) United States Patent
Tow

(10) Patent No.: US 11,826,982 B2
(45) Date of Patent: *Nov. 28, 2023

(54) COVER PLATE AND A COVER PLATE ASSEMBLY FOR A CONCEALED FIRE PROTECTION SPRINKLER

(71) Applicant: The Reliable Automatic Sprinkler Co. Inc., Liberty, SC (US)

(72) Inventor: John Tow, Liberty, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,557

(22) Filed: Nov. 29, 2022

(65) Prior Publication Data

US 2023/0104719 A1 Apr. 6, 2023

Related U.S. Application Data

(63) Continuation of application No. 16/085,793, filed as application No. PCT/US2017/025818 on Apr. 4, 2017, now Pat. No. 11,541,638.

(Continued)

(51) Int. Cl.
*A62C 37/09* (2006.01)
*B32B 15/01* (2006.01)
*A62C 37/12* (2006.01)

(52) U.S. Cl.
CPC ............ *B32B 15/015* (2013.01); *A62C 37/09* (2013.01); *A62C 37/12* (2013.01); *B32B 15/01* (2013.01); *B32B 15/013* (2013.01)

(58) Field of Classification Search
CPC ......... A62C 37/09; A62C 37/12; A62C 37/11; A62C 35/58–68; A62C 37/08–28; A62C 37/10; A62C 37/46–48; B32B 15/015; B32B 15/01; B32B 15/013; B32B 2250/02; B05B 1/28; Y10T 137/1963

(Continued)

(56) References Cited

U.S. PATENT DOCUMENTS 4,596,289 A 6/1986 Johnson
6,533,041 B1 3/2003 Jensen (Continued)

OTHER PUBLICATIONS

Notification of Transmittal of the International Search Report and the Written Opinion of the International Searching Authority, or the Declaration, International Search Report, and Written Opinion, dated Jun. 22, 2017, in corresponding International Patent Application No. PCT/US2017/25818.

(Continued)

*Primary Examiner* — Christopher R Dandridge
*Assistant Examiner* — Juan C Barrera
(74) *Attorney, Agent, or Firm* — Venable LLP

(57) ABSTRACT

A cover plate is configured to be releasably connected to a concealed fire protection sprinkler to conceal the fire protection sprinkler. The cover plate includes a first layer of metal on a first side of the cover plate that faces the concealed fire protection sprinkler, and a second layer of metal on a second side of the cover plate, the second side being opposite to the first side. The second layer of metal is more resistant to corrosion than the first layer, and is bonded to the first layer. In addition, the first layer is more thermally conductive than the second layer.

32 Claims, 7 Drawing Sheets

Related U.S. Application Data

(60) Provisional application No. 62/321,339, filed on Apr. 12, 2016.

(58) Field of Classification Search
USPC ............. 169/42, 37, 90, 38, 39, 40, 41
See application file for complete search history.

(56) References Cited

U.S. PATENT DOCUMENTS

| | | | |
|---|---|---|---|
| 6,840,329 B2 | 1/2005 | Kikuchi et al. | |
| 7,275,603 B2 | 10/2007 | Polan | |
| 8,176,987 B2 * | 5/2012 | Rekeny | F16F 1/025 169/57 |
| 8,695,719 B2 | 4/2014 | Retzloff et al. | |
| 11,541,638 B2 * | 1/2023 | Tow | B32B 15/01 |
| 2003/0196821 A1 * | 10/2003 | Kikuchi | A62C 37/09 169/37 |
| 2008/0308285 A1 | 12/2008 | Su et al. | |
| 2009/0169918 A1 * | 7/2009 | Haynes | G01K 5/66 374/E5.001 |
| 2010/0294521 A1 | 11/2010 | Thompson | |
| 2011/0203814 A1 | 8/2011 | Thompson | |
| 2013/0020406 A1 | 1/2013 | Koiwa | |
| 2014/0305663 A1 | 10/2014 | Rekeny | |

OTHER PUBLICATIONS

Notification of Transmittal of International Preliminary Report on Patentability, and International Preliminary Report on Patentability, dated May 3, 2018, in corresponding International Patent Application No. PCT/US2017/25818.

* cited by examiner

# COVER PLATE AND A COVER PLATE ASSEMBLY FOR A CONCEALED FIRE PROTECTION SPRINKLER

CROSS REFERENCE TO RELATED APPLICATIONS

This application is a continuation of U.S. patent application Ser. No. 16/085,793, filed on Sep. 17, 2018, now U.S. Pat. No. 11,541,638, issued Jan. 3, 2023, which is a U.S. national stage application of PCT International Patent Application No. PCT/US2017/025818, filed Apr. 4, 2017, which claims priority from U.S. Provisional Patent Application No. 62/321,339, filed Apr. 12, 2016. Each of these applications is incorporated herein in their entireties.

FIELD OF THE INVENTION

Our invention relates generally to a cover plate and a cover plate assembly for concealing a fire protection sprinkler.

Conventional cover plates for fire protection sprinklers are typically used with deployable/drop-down deflector assemblies, such as those described in commonly-assigned U.S. Pat. No. 7,275,603 (Polan). These cover plates are soldered to a skirt. When the solder that attaches the cover plate to the skirt reaches the temperature rating of the cover plate, the solder melts and releases the cover plate from the skirt, exposing the sprinkler to the room being protected. These cover plates must be made of a material that is readily soldered, and are typically made of a metal, such as copper. When cover plates made of copper are used in spaces or rooms, such as food processing facilities, that are washed down frequently with water and, possibly, with chemicals, however, the copper surface of the cover plate can become tarnished or corroded over time, giving the cover plates a discolored, unsightly appearance.

One conventional method to address this undesirable appearance of the copper cover plates is to provide a coat of paint over the surface of the cover plate facing the protected room. Frequent cleaning of the protected room, however, can cause the coat of paint to erode, bubble, and/or strip over time, again giving the cover plates an unsightly appearance.

In addition, the sensitivity of a fire protection sprinkler can be affected by covering the fire protection sprinkler with a cover plate. As such, concealed fire protection sprinklers are designed and tested to have a predetermined sensitivity when configured with an approved concealed sprinkler cover plate. Conventionally, such concealed fire protection sprinklers and cover plates are tested according to relevant standards promulgated by Underwriters Laboratories, Inc. (UL), of Northbrook, Illinois, United States.

Current UL listing criteria require that quick response (QR) fire protection sprinklers and QR extended coverage fire protection sprinklers for light hazard occupancies, for example, must achieve complete activation of the cover plate and a thermally-responsive element (e.g., a bulb or a soldered link) within seventy-five (75) seconds when tested in accordance with UL Standard 199, Section 31, entitled "Room heat test for QR and QR extended coverage sprinklers." The current UL listing criteria also require that QR fire protection sprinklers and QR extended coverage fire protection sprinklers for ordinary hazard occupancies, for example, must achieve complete activation of the cover plate and the thermally-responsive element (e.g., a bulb or a soldered link) within fifty-five (55) seconds when tested in accordance with UL Standard 199, Section 31, entitled "Room heat test for QR and QR extended coverage sprinklers."

SUMMARY OF THE INVENTION

To address the problems described above, our invention provides a cover plate for a concealed fire protection sprinkler, the cover plate having a first layer of metal on a first side of the cover plate that faces the fire protection sprinkler, and a second layer of metal on a side of the cover plate that faces an enclosure to be protected, in which the first layer of metal is more thermally conductive than the second layer, and the second layer is more resistant to corrosion than is the first layer.

More specifically, our invention provides a cover plate that is releasably connected to a concealed fire protection sprinkler, and that is configured to conceal the fire protection sprinkler. The cover plate includes a first layer of metal on a first side of the cover plate that faces the concealed fire protection sprinkler, and a second layer of metal on a second side of the cover plate, the second side being opposite to the first side. The second layer of metal is more resistant to corrosion than the first layer, and is bonded to the first layer. The first layer is more thermally conductive than the second layer, and, in at least one embodiment, a thickness of the first layer is greater than a thickness of the second layer.

By virtue of our invention, it is possible to provide a cover plate having corrosion resistance due to the nature of the second layer of metal on a room side of the fire protection sprinkler, while maintaining a response time of the fire protection sprinkler due to the high thermal conductivity of the first layer of metal.

In one embodiment, the first layer of metal comprises copper, and the second layer of metal comprises stainless steel. In another embodiment, the thickness of the first layer is at least 16% of the total thickness of the first and second layers. In yet another, the thickness of the first layer is at least 80% of the total thickness of the first and second layers.

By virtue of our invention, it is possible to provide a cover plate that meets the UL criteria, for example, discussed above for QR fire protection sprinklers and QR extended coverage fire protection sprinklers for light and ordinary hazard occupancies, while also providing a corrosive resistant cover plate.

Figure 1A:
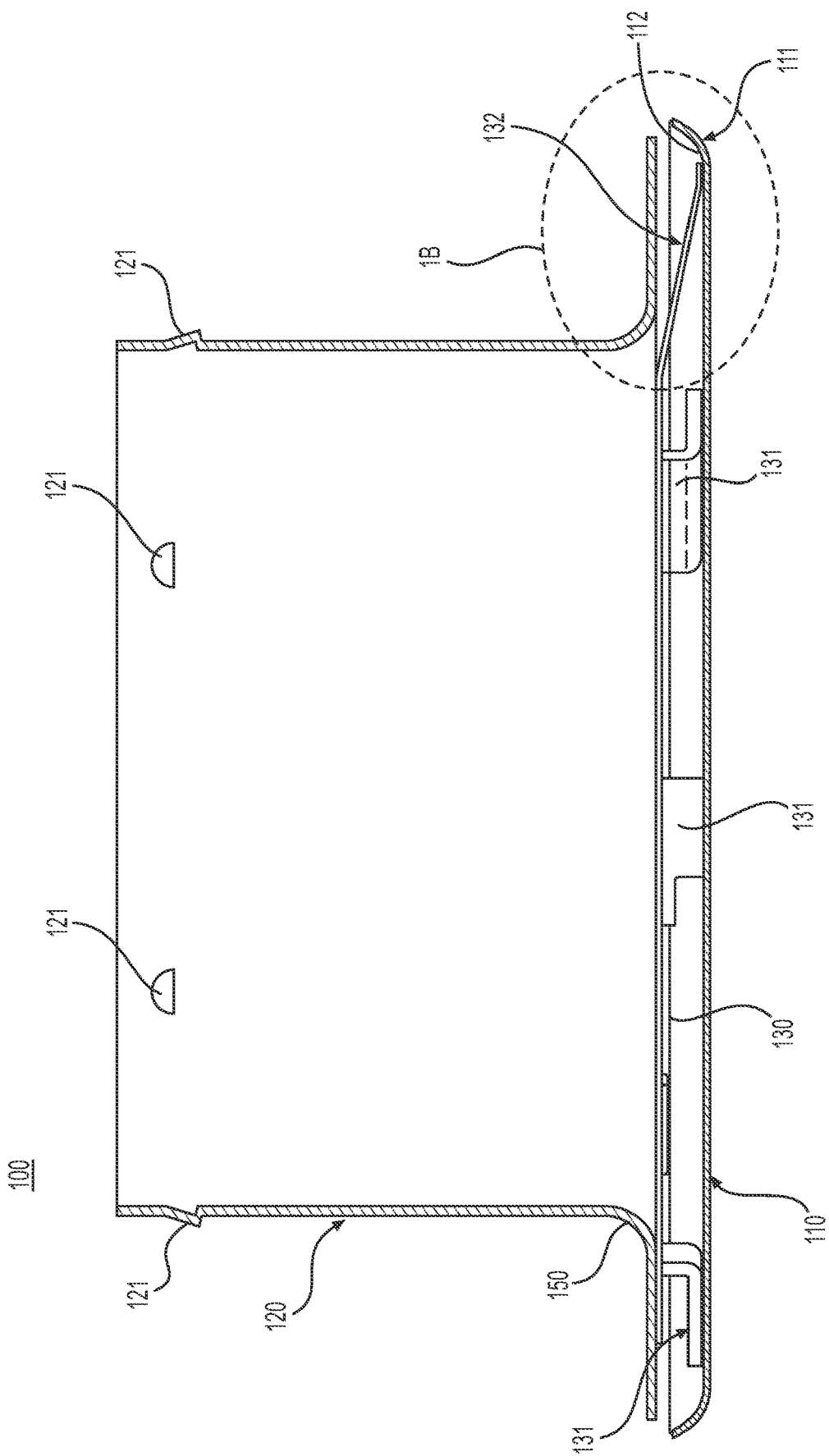
FIG. 1A shows a side cross-sectional view of a cover plate assembly for a concealed fire protection sprinkler, according to an embodiment described herein.

Any reference numeral that appears in different figures represents the same element in those figures, even if that element is not described separately with respect to each figure.

DETAILED DESCRIPTION OF THE PREFERRED EMBODIMENTS

FIG. 1A shows a side cross-sectional view of a cover plate assembly 100 for a concealed fire protection sprinkler (300 in FIG. 6), according to one embodiment of the invention. The cover plate assembly 100 includes a cover plate 110, an escutcheon 120, and a frame 130, all aligning along a central axis. The escutcheon 120 is cylindrical, and has a circumferential, annular flange 150 on an outwardly facing end (the lower end in FIG. 1A). The escutcheon 120 is formed of metal, such as copper or a copper alloy. The escutcheon 120 includes perforations 121 on outer walls for installation with the fire protection sprinkler 300. In other embodiments, the escutcheon 120 may include threading for installation with the fire protection sprinkler 300.

The cover plate 110 is flat and circular, and includes a first layer 112 and a second layer 111. The first layer 112 is on a first side of the cover plate 110 that faces the escutcheon 120 and the fire protection sprinkler 300. The second layer 111 is on a second side of the cover plate 110, opposite to the first side of the cover plate 110, and facing a room to be protected by the fire protection sprinkler 300. The first layer 112 and the second layer 111 are bonded together.

The first layer 112 is formed of a metal having high thermal conductivity, such as copper or a copper alloy. The second layer 111 is formed of a metal having high resistance to corrosion, such as stainless steel. Of course, the materials used to form the first layer 112 and the second layer 111 of the cover plate 110 are not limited to copper and stainless steel, and, in other embodiments, the cover plate 110 can be formed of other materials, as long as a material forming the first layer 112 has high thermal conductivity and a material forming the second layer 111 has high resistance to corrosion.

Other embodiments include the first layer 112 comprising bronze, brass, nickel, beryllium nickel, or sterling silver, and the second layer 111 comprising titanium, molybdenum, alloys, such as those sold under the trademark Incoloy® (examples of such alloys include UNS 567956 and UNS N08020) (Incoloy® is a registered trademark of Huntington Alloys Corporation, Huntington, West Virginia), or titanium-zirconium-molybdenum (TZM) alloy.

The frame 130 is formed of a metal, such as copper or a copper alloy, and includes multiple tabs 131 and a spring 132. The frame 130 is in the shape of a flat ring, and the multiple tabs 131 are formed on the frame 130 by downwardly bending outer sections of the ring of the frame 130 into L-shapes.

The frame 130 is mounted and fixed to the escutcheon 120 around a bottom periphery of the escutcheon flange 150 using, for example, an adhesive. The cover plate 110 is attached to the frame 130 with solder between the bottom of each of the multiple tabs 131 and the first layer 112 on the first side of the cover plate 110, using a solder that is designed to melt at a predetermined temperature, for example, 135° F., to allow for release of the cover plate 110 and to expose the fire protection sprinkler 300. The spring 132 applies a downward force against the cover plate 110 once the cover plate 110 is soldered to the frame 130. The application of force by the spring 132 facilitates the release of the cover plate 110 once the solder has melted.

Figure 1B:
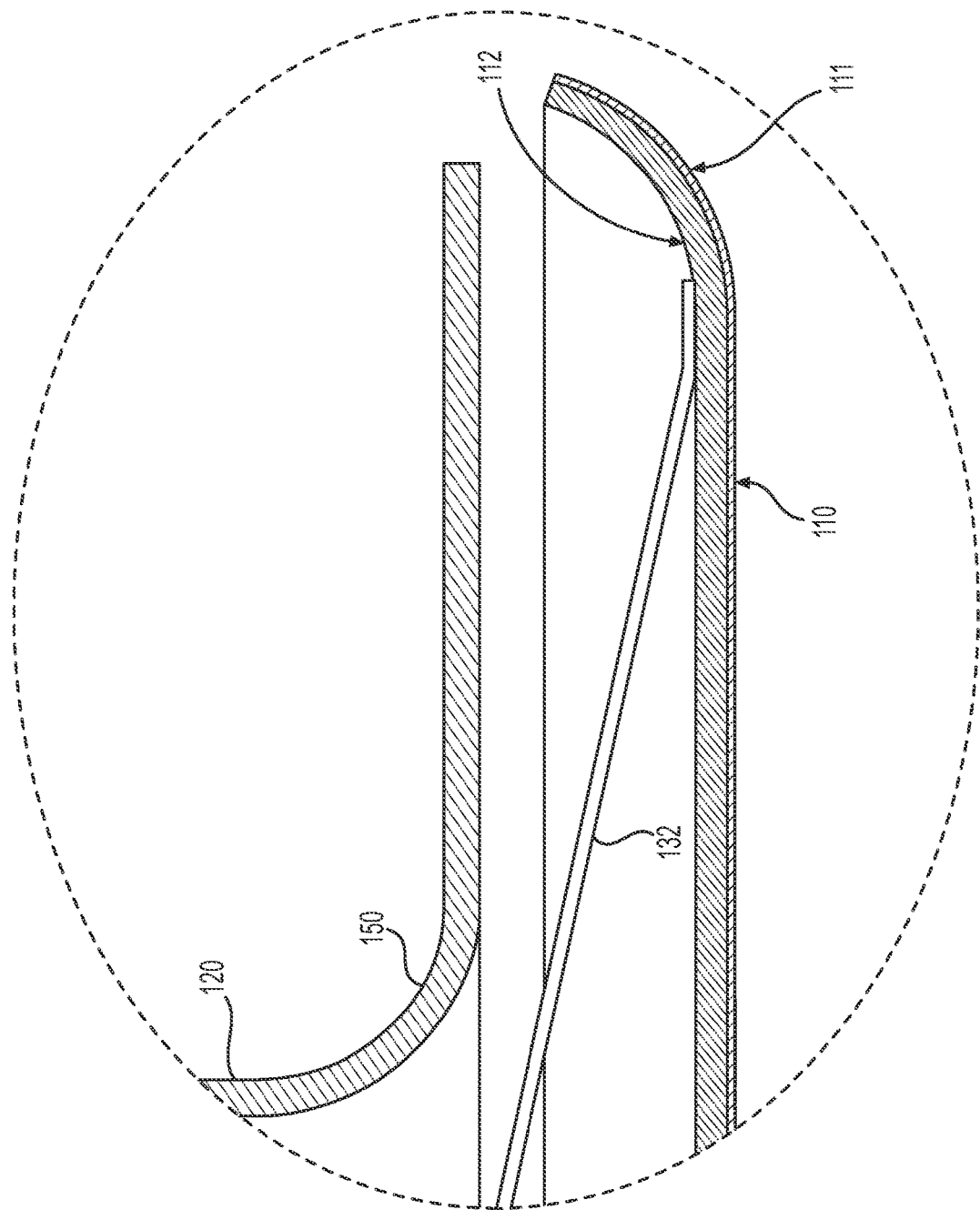
FIG. 1B is a detail view of a portion of the cover plate assembly shown in FIG. 1A.
Figure 2:
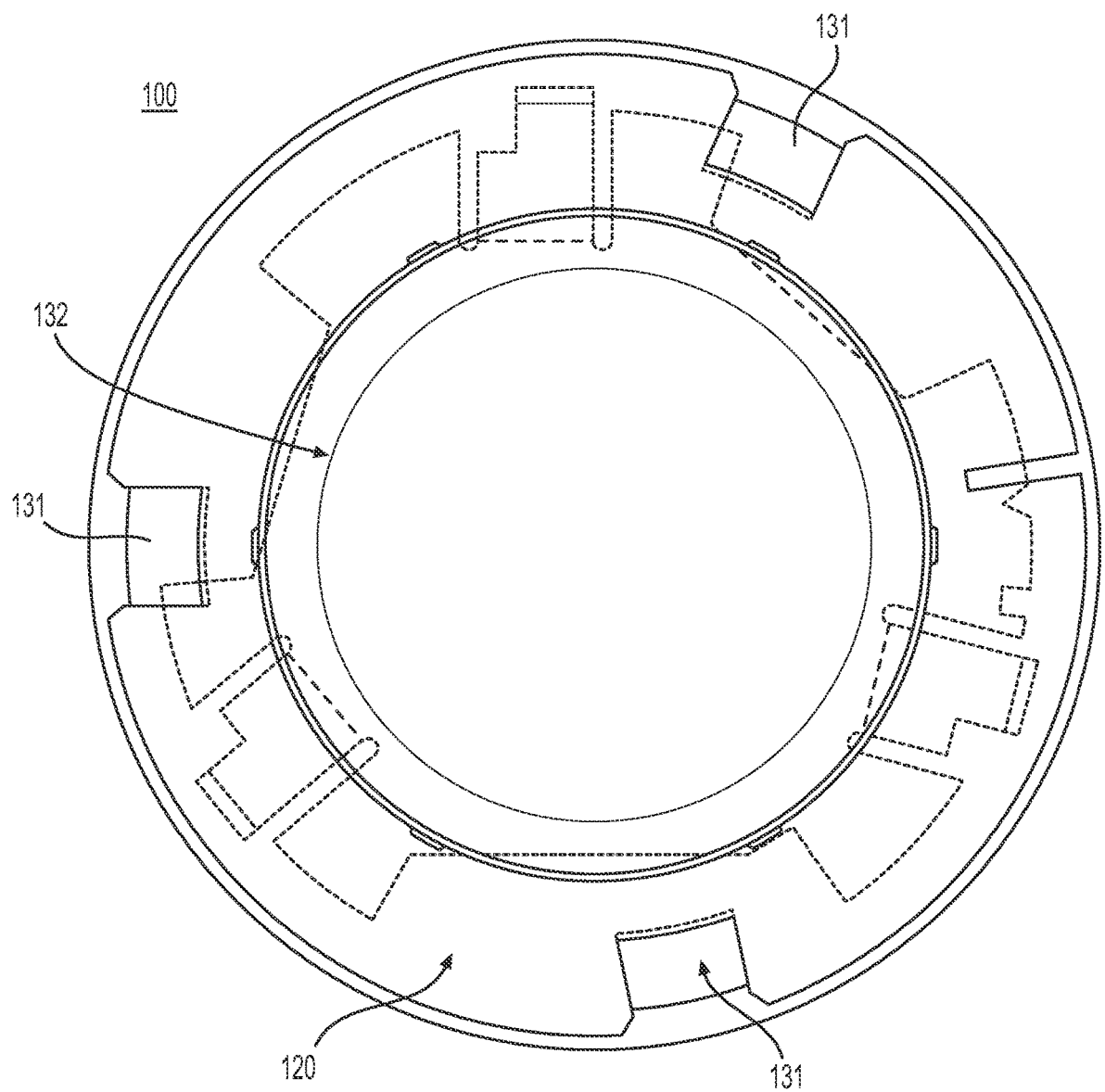
FIG. 2 shows a back view of the cover plate assembly shown in FIG. 1A.

FIG. 1B is a detail view of the cross-sectional view of the cover plate assembly 100 shown in FIG. 1A. The view of FIG. 1B provides a detailed look at the first layer 112 and the second layer 111 of the cover plate 110. As shown in FIG. 1B, a dimension of the first layer 112 (in this example, the thickness of the first layer 112) is greater than that of the second layer 111. The second layer 111 is formed of a material that is more resistant to corrosion than the material that forms the first layer 112. Also, the first layer 112 is more thermally conductive than the second layer 111. In other words, the first layer 112 has a higher thermal conductivity than that of the second layer 111.

In one embodiment, the thickness of the first layer 112 is at least 16% of the combined thicknesses of the first layer 112 and the second layer 111 (i.e., the total thickness of the cover plate 110). In another embodiment, the thickness of the first layer 112 is at least 80% of the total thickness of the cover plate 110. It is within the scope of the invention for the thickness of the first layer 112 to be in the range from 16% to 80%, inclusive, of the combined thicknesses of the first layer 112 and the second layer 111.

In one embodiment, the first layer 112 of the cover plate 110 is comprised of copper with a thickness of 0.0096 inches (0.24 mm), and the second layer 111 of the cover plate 110 is comprised of stainless steel with a thickness of 0.0024 inches (0.061 mm). In this embodiment, the cover plate 110 is comprised of 80% copper and 20% stainless steel (referring to the relation of the thickness of the layers, not to weight).

The cover plate 110 of the above-described embodiment successfully released in under forty-five (45) seconds with cover plates having temperature ratings ranging from 135° F. to 165° F.

Figure 3:
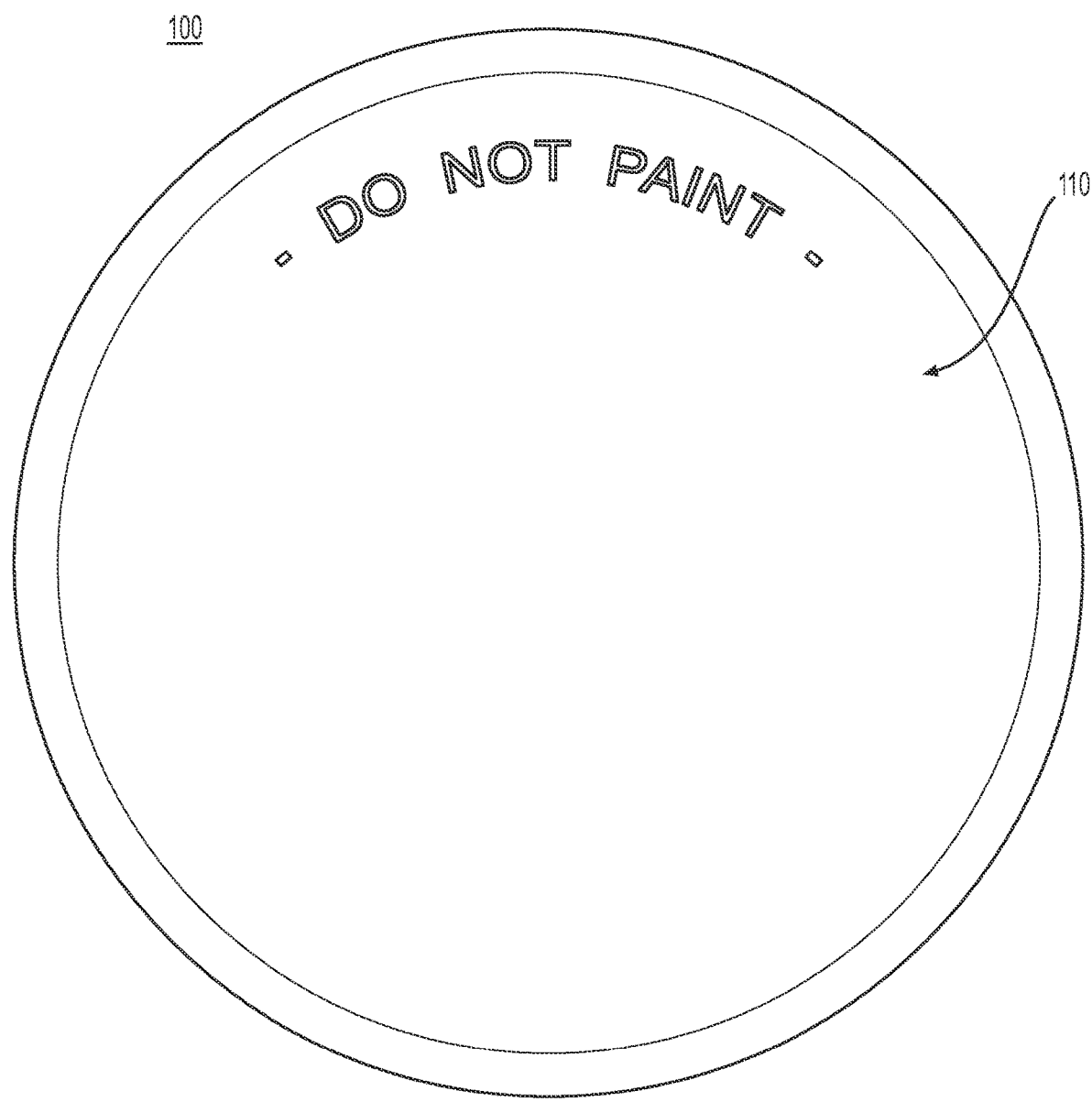
FIG. 3 shows a front view of the cover plate assembly shown in FIG. 1A

FIG. 3 shows a view of the second layer 111 on the second or exterior side of the cover plate 110 that faces the room to be protected. As shown in FIG. 3, the cover plate 110 does not require painting and, in fact, must not be painted after installation. In addition, the cover plate 110 has an aesthetically pleasing look, or finish, for example, of stainless steel.

Figure 4:
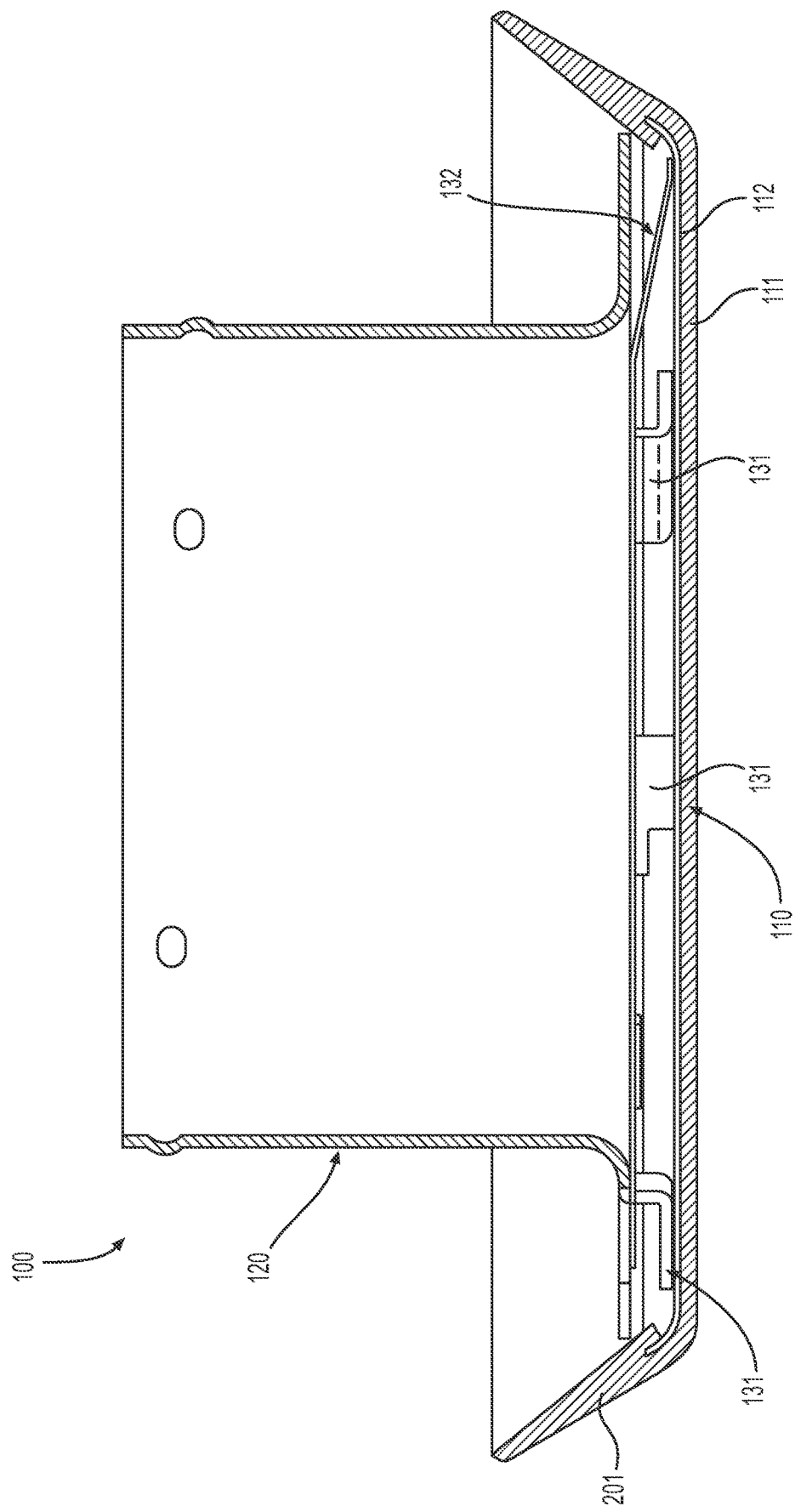
FIG. 4 shows a side cross-sectional view of the cover plate assembly shown in FIG. 1A, including a gasket seal.
Figure 5:
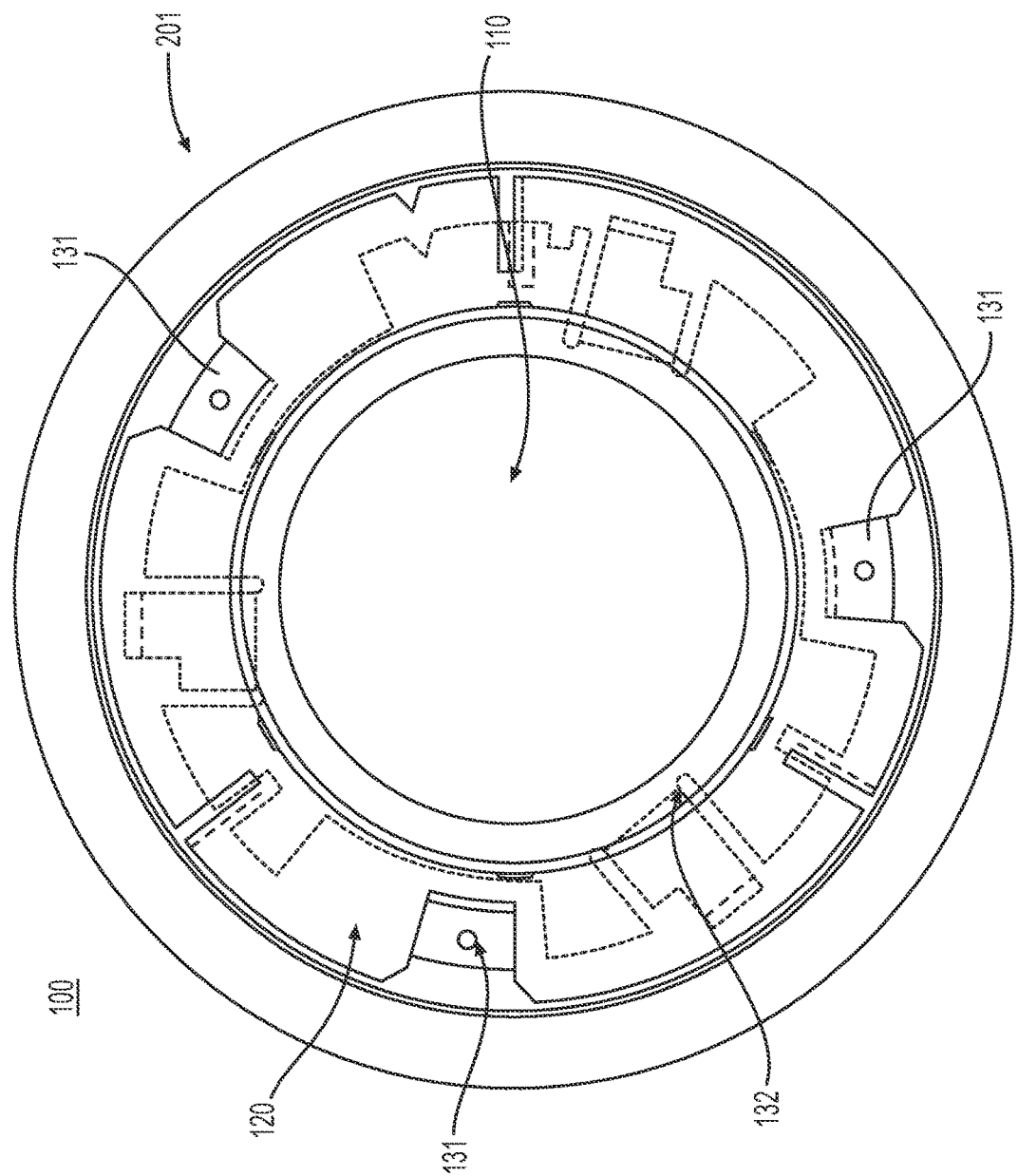
FIG. 5 shows a back view of the cover plate assembly shown in FIG. 4.

FIGS. 4 and 5 show a side section view and a back view, respectively, of the cover plate assembly 100 shown in FIG. 1A, including a gasket seal 201. The gasket seal 201 is formed around the cover plate 110 along the circumference of the cover plate 110. The gasket seal 201 limits the infiltration of gases or liquids from the room to be protected to a space above the cover plate 110.

Figure 6:
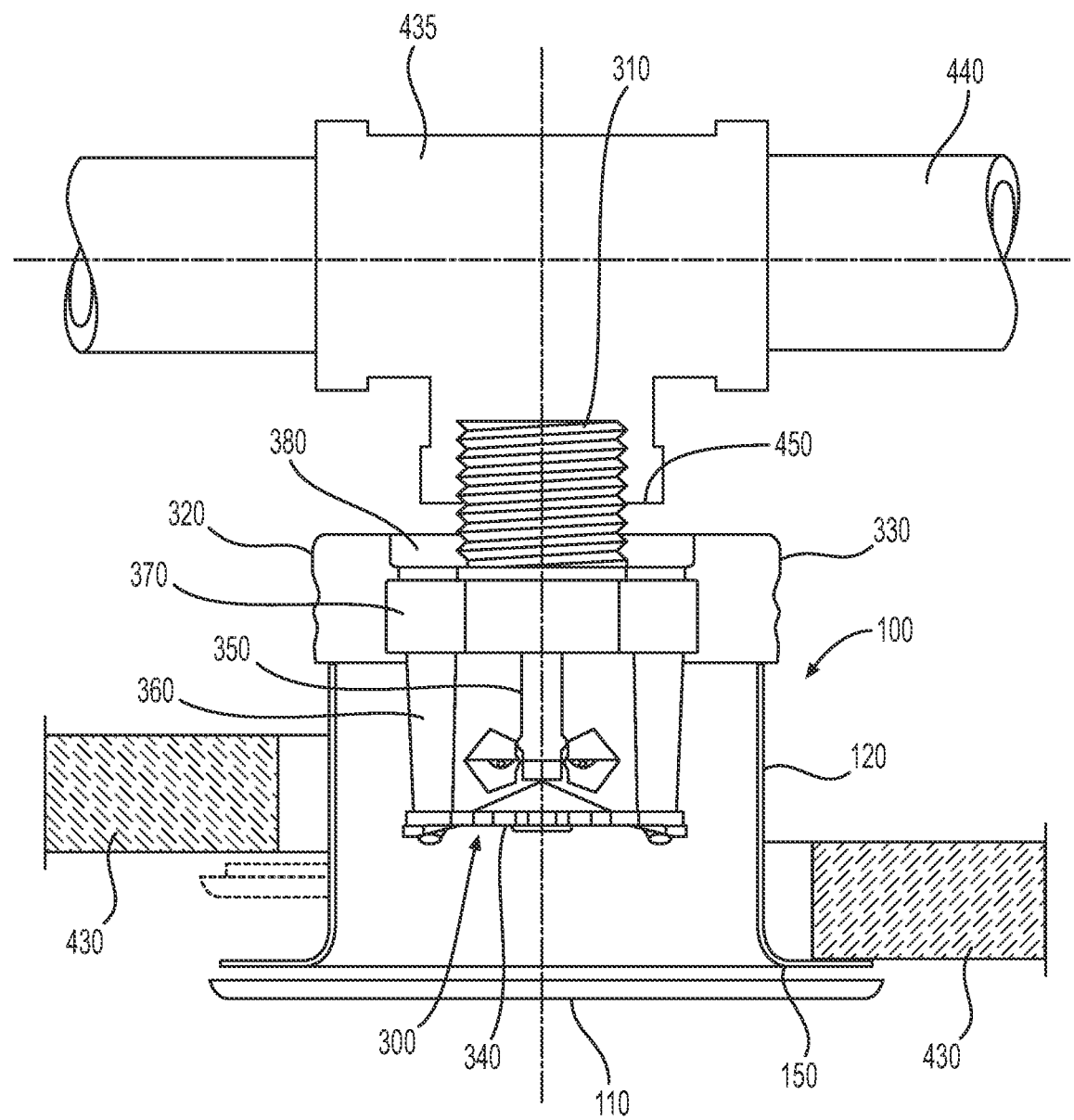
FIG. 6 shows the cover plate assembly shown in FIG. 1A and a concealed fire protection sprinkler installed in a ceiling.

FIG. 6 shows the cover plate assembly 100 shown in FIG. 1A and the concealed fire protection sprinkler 300 installed in a ceiling 430, according to an embodiment. As shown in FIG. 6, the fire protection sprinkler 300 may be installed within a support cup 320, the escutcheon 120, and the cover assembly 100 to form a concealed configuration. The escutcheon 120 is installed with a press or threaded fit into the ridged outer surface walls 330 of the support cup 320.

As described above with reference to FIG. 1A, the cover plate 110 is mounted on raised portions (e.g., the multiple tabs 131 of the frame 130 in FIG. 1A) around the periphery of the escutcheon flange 150. As also described above, the cover plate 110 is attached to the multiple tabs 131 with solder that is designed to melt at a predetermined temperature, e.g., 135° F., to allow for release of the cover plate 110. The raised portions 131 create a gap or a space between the cover plate 110 and the escutcheon 120 that allows air flow to reach the fire protection sprinkler 300. The release of the cover plate 110 allows a deflector 340, mounted on the fire protection sprinkler 300, to drop down into a deployed position. At a second predetermined temperature, e.g., 165°

F., a fusible soldered link 350 of the fire protection sprinkler 300 separates to initiate the flow of a fluid from the fire protection sprinkler 300.

To install the fire protection sprinkler 300, the support cup 320, having a diameter of, e.g., 2.28 inches (57.91 mm), is inserted into a cavity in the ceiling 430, the cavity having a diameter of, e.g., about 2.63 inches (66.68 mm), and a threaded base 310 of the fire protection sprinkler 300 is connected to an output fitting 435 of a conduit 440. The escutcheon 120 and the cover plate 110 are then installed in the support cup 320, so that the escutcheon flange 150 rests on the outer surface of the ceiling 430 (the outer surface of the cover plate 110 is about 0.188 inch (4.77 mm) from the surface of the ceiling 430 due to the gap between the escutcheon flange 150 and the cover plate 110).

The support cup 320 and the escutcheon 120 are configured to allow for an adjustment to accommodate variations in the distance between a face 450 of the output fitting 435 and the surface of the ceiling 430, referred to as a "field adjustment." The field adjustment is sometimes needed because the deflector 340 must be properly located below the ceiling 430 in the deployed position, but positioning of the sprinkler conduits 440 precisely with respect to the ceiling 430 surface is difficult, due to the practicalities of building construction. To ensure the correct positioning of the deployed deflector 340, the distance between the face 450 of the output fitting 435 and the ceiling 430 should not be more than 2 inches (50.8 mm).

The field adjustment is achieved by allowing the escutcheon 120 to be positioned with a varying degree of overlap with the outer walls 330 of the support cup 320. The support cup 320 and the escutcheon 120 are configured so that any secure engagement between these components results in a proper position for the deflector 340 upon deployment.

The amount of field adjustment, in this example 0.5 inch (12.7 mm), is determined by the length of rods 360 of deflector support members 380 of the fire protection sprinkler 300, because the length of the rods 360 determines the amount of variation that can be accommodated in the position of the conduit 440 relative to the ceiling line 430. In other words, the rods 360 may be completely retracted within a respective housing member 370 before deployment, such as when the conduit 440 and, therefore, the fire protection sprinkler 300 are positioned as close as possible to the ceiling line 430. Alternatively, the rods 360 may be nearly ¾ extended before deployment, such as when the conduit 440 is positioned as far as possible above the ceiling line 430. The length of the rods 360, in turn, determines the height of the outer walls 330 of the support cup 320. Thus, the outer walls 330 of the support cup 320 must have a height of slightly more than 0.5 inch (12.7 mm) in the embodiment described herein.

Configuring deflector support members 380 that include the housing members 370 and the rods 360, such that the rods 360 extend through the housing members 370 and the flange 150, allows for the use of a shallower support cup 320, because the depth of the support cup 320 is primarily determined by the length of the rods 360. This, in turn, results in the thermally-responsive element, for example, the fusible soldered link 350, being located closer to the ceiling 430, thereby improving sprinkler sensitivity. In contrast, in conventional concealed fire protection sprinklers, guide pins coupled to the deflector are generally positioned below the flange, requiring a deeper support cup because the depth of the support cup is determined by the length of the guide pins plus the flange thickness. Consequently, the thermally-responsive element is located farther from the ceiling, resulting in reduced sprinkler sensitivity.

Based on our findings, stainless steel is not typically used in cover plates because it has a lower thermal conductivity than copper (i.e., stainless steel is more insulating than copper), so using stainless steel instead of copper slows the heating of the solder and, therefore, slows the operation of the fire protection sprinkler. In addition, we have found that stainless steel is more difficult to solder than copper.

By virtue of the foregoing arrangement, our invention provides a cover plate, for example, a composite copper/stainless steel cover plate that provides corrosion resistance on the room side of a fire protection sprinkler, while maintaining the response time of the fire protection sprinkler due to the high thermal conductivity of the copper backing.

More specifically, the foregoing arrangement meets all of the current UL listing criteria set forth in UL Standard 199, Section 31. For example, the foregoing arrangement meets the requirement that quick response (QR) fire protection sprinklers and QR extended coverage fire protection sprinklers for light hazard occupancies, for example, must achieve complete activation of the cover plate and a thermally-responsive element (e.g., a bulb or a soldered link) within seventy-five (75) seconds, and the requirement that QR fire protection sprinklers and QR extended coverage fire protection sprinklers for ordinary hazard occupancies, for example, must achieve complete activation of the cover plate and the thermally-responsive element (e.g., a bulb or a soldered link) within fifty-five (55) seconds, when tested in accordance with UL Standard 199, Section 31, entitled "Room heat test for QR and QR extended coverage sprinklers."

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

What I claim is:

1. A cover plate assembly for covering a concealed fire protection sprinkler, the cover plate assembly comprising:
    (a) a cylindrical escutcheon removably attached to a support cup by a press-fit or a threaded connection into outer walls of the support cup, the escutcheon having a circumferential annular flange, and perforations on outer walls for installation with the fire protection sprinkler, the escutcheon being made of copper or a copper alloy;
    (b) a metal frame being made of copper or a copper alloy and having multiple tabs, the multiple tabs being formed on the metal frame by downwardly bending outer sections of the metal frame into L-shapes, the metal frame being mounted to the circumferential annular flange of the escutcheon; and
    (c) a cover plate releasably connected to the multiple tabs of the metal frame around the perimeter of the circumferential annular flange of the escutcheon, the metal frame applying a downward force against the cover plate when the cover plate assembly is attached to the metal frame, the cover plate being configured to conceal the fire protection sprinkler, the cover plate being attached to the metal frame with solder between the of each of the multiple tabs and a first layer on a first side of the cover plate, the solder being designed to melt at a first predetermined temperature to allow for release of the cover plate to expose the fire protection sprinkler, and the cover plate having an entire length from one end to an opposite end and comprising:
- (i) the first layer on the first side of the cover plate extending along the length of the cover plate from the one end of the cover plate to the opposite end of the cover plate, the first side of the cover plate having the first layer directly facing the concealed fire protection sprinkler, wherein the first layer comprises a copper alloy; and
- (ii) a second layer of metal on a second side of the cover plate, the second side being opposite to the first side and extending along the length of the cover plate from the one end of the cover plate to the opposite end of the cover plate, the second layer of metal being more resistant to corrosion than is the first layer, and being bonded to the first layer, wherein the second layer comprises a stainless steel alloy, wherein (1) the first layer of metal facing the fire protection sprinkler is more thermally conductive than is the second layer, and (2) the first layer of metal has a greater thickness than that of the second layer, and wherein the first predetermined temperature is less than a second predetermined temperature, at which the fire protection sprinkler is configured to activate upon melting of a fusible soldered link.

2. The cover plate assembly according to claim 1, wherein the thickness of the first layer is at least 80% of the combined thickness of the first and second layers.

3. The cover plate assembly according to claim 1, wherein the second layer of metal on the second side of the cover plate faces a room to be protected by the fire protection sprinkler.

4. The cover plate assembly according to claim 1, wherein the first predetermined temperature is 135° F.

5. The cover plate assembly according to claim 1, wherein the second predetermined temperature is 165° F.

6. The cover plate assembly according to claim 1, wherein the cover plate is successfully released in under forty-five (45) seconds with cover plates having temperature ratings ranging from 135° F. to 165° F.

7. The cover plate assembly according to claim 1, wherein the cover plate is unpainted after installation.

8. The cover plate assembly according to claim 1, further comprising a sealing gasket provided around a circumference of the cover plate.

9. The cover plate assembly according to claim 8, wherein the support cup and the escutcheon are configured to allow for a field adjustment to accommodate variations in the distance between a face of an output fitting of the fire protection sprinkler and the surface of the ceiling.

10. The cover plate assembly according to claim 8, wherein the field adjustment is achieved by allowing the escutcheon to be positioned with a varying degree of overlap with the outer walls of the support cup.

11. The cover plate assembly according to claim 1, wherein installation of the fire protection sprinkler allows a thermally responsive element to be spaced from the ceiling, resulting in improved sprinkler sensitivity.

12. The cover plate assembly according to claim 1, further comprising deflector support members that include rods.

13. The cover plate assembly according to claim 12, wherein varying the lengths of the rods determines an amount of variation that can be accommodated in installation of the fire protection sprinkler.

14. The cover plate assembly according to claim 1, wherein the composite of the copper alloy and the stainless steel cover plate provides corrosion resistance on the room side of the fire protection sprinkler while maintaining response time of the fire protection sprinkler due to the higher thermal conductivity of the copper alloy.

15. The cover plate assembly according to claim 1, wherein the metal frame also includes a spring, and application of force by the spring facilitates release of the cover plate once the solder has melted.

16. The cover plate assembly according to claim 15, wherein the release of the cover plate allows a deflector of the fire protection sprinkler to drop down into a deployed position.

17. A concealed fire sprinkler arrangement comprising:
- (A) a concealed fire protection sprinkler comprising:
  - (a) a thermally responsive element positioned to releasably retain a seal cap, the thermally-responsive element comprising a fusible soldered link;
  - (b) a plurality of deflector support members extending from a flange; and
  - (c) a deflector connected to the plurality of deflector support members;
- (B) a support cup having outer walls and configured to support the concealed fire protection sprinkler; and
- (C) a cover plate assembly for covering the concealed fire protection sprinkler, the cover plate assembly comprising:
  - (a) a cylindrical escutcheon removably attached to the support cup by a press-fit or a threaded connection into the outer walls of the support cup, the escutcheon having a circumferential annular flange, and perforations on outer walls for installation with the fire protection sprinkler, the escutcheon being made of copper or a copper alloy;
  - (b) a metal frame being made of copper or a copper alloy and having multiple tabs, the multiple tabs being formed on the metal frame by downwardly bending outer sections of the metal frame into L-shapes, the metal frame being mounted to the circumferential annular flange of the escutcheon; and
  - (c) a cover plate releasably connected to the multiple tabs of the metal frame around the perimeter of the circumferential annular flange of the escutcheon, the metal frame applying a downward force against the cover plate when the cover plate assembly is attached to the metal frame, the cover plate being configured to conceal the fire protection sprinkler, the cover plate being attached to the metal frame with solder between the of each of the multiple tabs and a first layer on a first side of the cover plate, the solder being designed to melt at a first predetermined temperature to allow for release of the cover plate to expose the fire protection sprinkler, and the cover plate having an entire length from one end to an opposite end and comprising:
    - (i) the first layer on the first side of the cover plate extending along the length of the cover plate from the one end of the cover plate to the opposite end of the cover plate, the first side of the cover plate having the first layer directly facing the concealed fire protection sprinkler, wherein the first layer comprises a copper alloy; and
    - (ii) a second layer of metal on a second side of the cover plate, the second side being opposite to the first side and extending along the length of the cover plate from the one end of the cover plate to the opposite end of the cover plate, the second layer of metal being more resistant to corrosion than is the first layer, and being bonded to the first layer, wherein the second layer comprises a stainless steel alloy, wherein (1) the first layer of metal facing the fire protection sprinkler is more thermally conductive than is the second layer, and (2) the first layer of metal has a greater thickness than that of the second layer, and wherein the first predetermined temperature is less than a second predetermined temperature, at which the fire protection sprinkler is configured to activate upon melting of the fusible soldered link.

18. The concealed sprinkler arrangement according to claim 17, wherein the thickness of the first layer is at least 80% of the combined thickness of the first and second layers.

19. The concealed sprinkler arrangement according to claim 17, wherein the second layer of metal on the second side of the cover plate faces a room to be protected by the fire protection sprinkler.

20. The concealed fire sprinkler arrangement according to claim 17, wherein the first predetermined temperature is 135° F.

21. The concealed fire sprinkler arrangement according to claim 17, wherein the second predetermined temperature is 165° F.

22. The concealed fire sprinkler arrangement according to claim 17, wherein the cover plate is successfully released in under forty-five (45) seconds with cover plates having temperature ratings ranging from 135° F. to 165° F.

23. The concealed fire sprinkler arrangement according to claim 17, wherein the cover plate is unpainted after installation.

24. The concealed fire sprinkler arrangement according to claim 17, further comprising a sealing gasket provided around a circumference of the cover plate.

25. The concealed fire sprinkler arrangement according to claim 24, wherein the support cup and the escutcheon are configured to allow for a field adjustment to accommodate variations in the distance between a face of an output fitting of the fire protection sprinkler and the surface of the ceiling.

26. The concealed fire sprinkler arrangement according to claim 25, wherein the field adjustment is achieved by allowing the escutcheon to be positioned with a varying degree of overlap with the outer walls of the support cup.

27. The concealed fire sprinkler arrangement according to claim 17, wherein installation of the fire protection sprinkler allows the thermally responsive element to be spaced from the ceiling, resulting in improved sprinkler sensitivity.

28. The concealed fire sprinkler arrangement according to claim 17, further comprising deflector support members that include rods.

29. The concealed fire sprinkler arrangement according to claim 28, wherein varying the lengths of the rods determines the amount of variation that can be accommodated in installation of the fire protection sprinkler.

30. The concealed fire sprinkler arrangement according to claim 17, wherein the composite of the copper alloy and the stainless steel cover plate provides corrosion resistance on the room side of the fire protection sprinkler while maintaining response time of the fire protection sprinkler due to the higher thermal conductivity of the copper alloy.

31. The concealed fire sprinkler arrangement according to claim 17, wherein the metal frame also includes a spring, and application of force by the spring facilitates release of the cover plate once the solder has melted.

32. The concealed fire sprinkler arrangement according to claim 31, wherein the release of the cover plate allows the deflector of the fire protection sprinkler to drop down into a deployed position.

* * * * *